United States Patent [19]

Imran

[11] Patent Number: 4,800,255

[45] Date of Patent: Jan. 24, 1989

[54] ELECTRONIC ACCESS CARD WITH VISUAL DISPLAY

[75] Inventor: Mir A. Imran, Palo Alto, Calif.

[73] Assignee: DataTrak, Inc., Mountain View, Calif.

[21] Appl. No.: 899,338

[22] Filed: Aug. 22, 1986

[51] Int. Cl.$^4$ .............................................. G06K 5/00
[52] U.S. Cl. ................................... 235/382; 235/492
[58] Field of Search ................ 235/487, 492, 380, 382

[56] References Cited

U.S. PATENT DOCUMENTS 4,298,793 11/1981 Melis .................................... 235/487
4,701,601 10/1987 Francini .............................. 235/492

FOREIGN PATENT DOCUMENTS

WO83/03018 9/1983 PCT Int'l Appl. .
2130412 5/1984 United Kingdom .

Primary Examiner—Harold I. Pitts
Attorney, Agent, or Firm—Flehr, Hohbach, Test, Albritton & Herbert

[57] ABSTRACT

Electronic access card comprising a printed circuit board. A microprocessor is carried by the printed circuit board. A keyboard is carried by the printed circuit board and is connected to the microprocessor for inserting information into the microprocessor. A coil is carried by the printed circuit board and is coupled to the microprocessor for receiving information to be conveyed to the microprocessor and for transmitting information from the microprocessor. Visual display means is coupled to the microprocessor for visually displaying information which is carried in the microprocessor.

22 Claims, 2 Drawing Sheets

ELECTRONIC ACCESS CARD WITH VISUAL DISPLAY

This invention relates to an electronic access card with visual display.

BACKGROUND OF THE INVENTION

In co-pending application Ser. No. 899,533, filed Aug. 22, 1986 there is disclosed an electronic access card which can be utilized in connection with a lock box of the type described in U.S. Pat. No. 4,609,780. However, the electronic access card disclosed in said U.S. Pat. No. 4,609,780 does not have a visual display and has other limitations. There is therefore a need for a new and improved electronic access card.

OBJECTS OF THE INVENTION

In general, it is an object of the present invention to provide an electronic access card which has a visual display.

Another object of the invention is to provide a card of the above character in which information can be scrolled in the visual display.

Another object of the invention is to provide a card of the above character which can be utilized in connection with lock boxes.

Another object of the invention is to provide a card of the above character which eliminates the need for telephone transmissions from a lock box.

Another object of the invention is to provide a card of the above character which utilizes active telemetry.

Another object of the invention is to provide a card of the above character in which a visual display can be given of the entries which have been made in the lock box.

Another object of the invention is to provide a card of the above character which produces an audible signal for telephonic transmission.

Another object of the invention is to provide a card of the above character which has a long life.

Another object of the invention is to provide a card of the above character which gives a low battery indication of the LCD display.

Another object of the invention is to provide a card of the above character in which information can be transmitted to a computer terminal.

Another object of the invention is to provide a card of the above character which can have the information contained therein read by a reader (via RF telemetry).

Another object of the invention is to provide a card of the above character which is capable of two way high speed transmission.

Additional objects and features of the invention will appear from the following description in which the preferred embodiments are set forth in detail in conjunction with the accompanying drawings.

BRIEF DESCRIPTION OF THE DRAWINGS

FIG. 3 is a circuit diagram of another embodiment of the electronic circuitry which can be utilized in the electronic access card shown in FIG. 1.

DESCRIPTION OF THE PREFERRED EMBODIMENT

Figure 1:
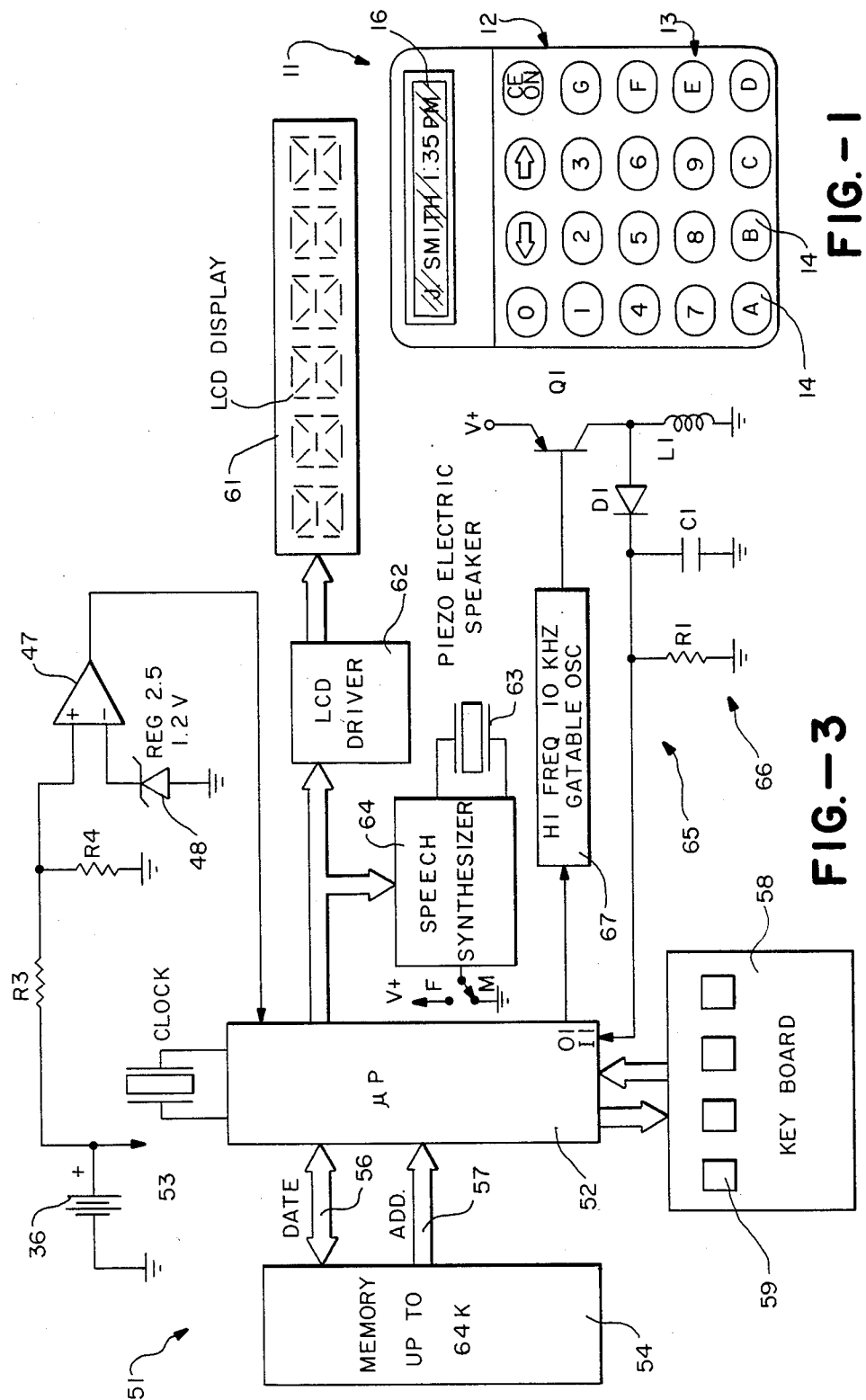
FIG. 1 is a front elevational view of an electronic access card with visual display incorporating the present invention.

In general, the present electronic access card consists of a printed circuit board. A microprocessor is carried by the printed circuit board. Key pad means is carried by the board and is connected to the microprocessor for inserting information into the microprocessor. Coil means is carried by the printed circuit board and is connected to the microprocessor for receiving and transmitting information with respect to the microprocessor. Visual display means is carried by the printed circuit board and is coupled to the microprocessor for displaying information in the microprocessor.

More in particular, the electronic access card 11 having a visual display in many respects is very similar to the electronic access card disclosed in co-pending application Ser. No. 899,533, filed Aug. 22, 1986. As disclosed therein such an electronic access card includes a printed circuit board 12 which has a key pad or keyboard assembly 13 mounted on the front side thereof. The key pad assembly includes a plurality of keys 14 in which 10 of the keys carry the arabic numerals 0–9 and in which other keys carry other suitable indicia. These indicia have been indicated as the letters A–G for convenience of illustration. However, if it is preferable that the exact purpose or function of the key be provided thereon. These functions can be as follows:

A: Obtain Key
B: Remove Shackle
C: Update Card
D: 24 Hour Use
E: Daytime Use
F: Interrogate Box
G: Printer Enable In addition, other keys 14 serve as scroll keys in which one of the keys has an arrow facing to the left and the other key has an arrow facing to the right as shown in FIG. 1. The remaining key can be identified as the "Clear" and "On" key.

Figure 2:
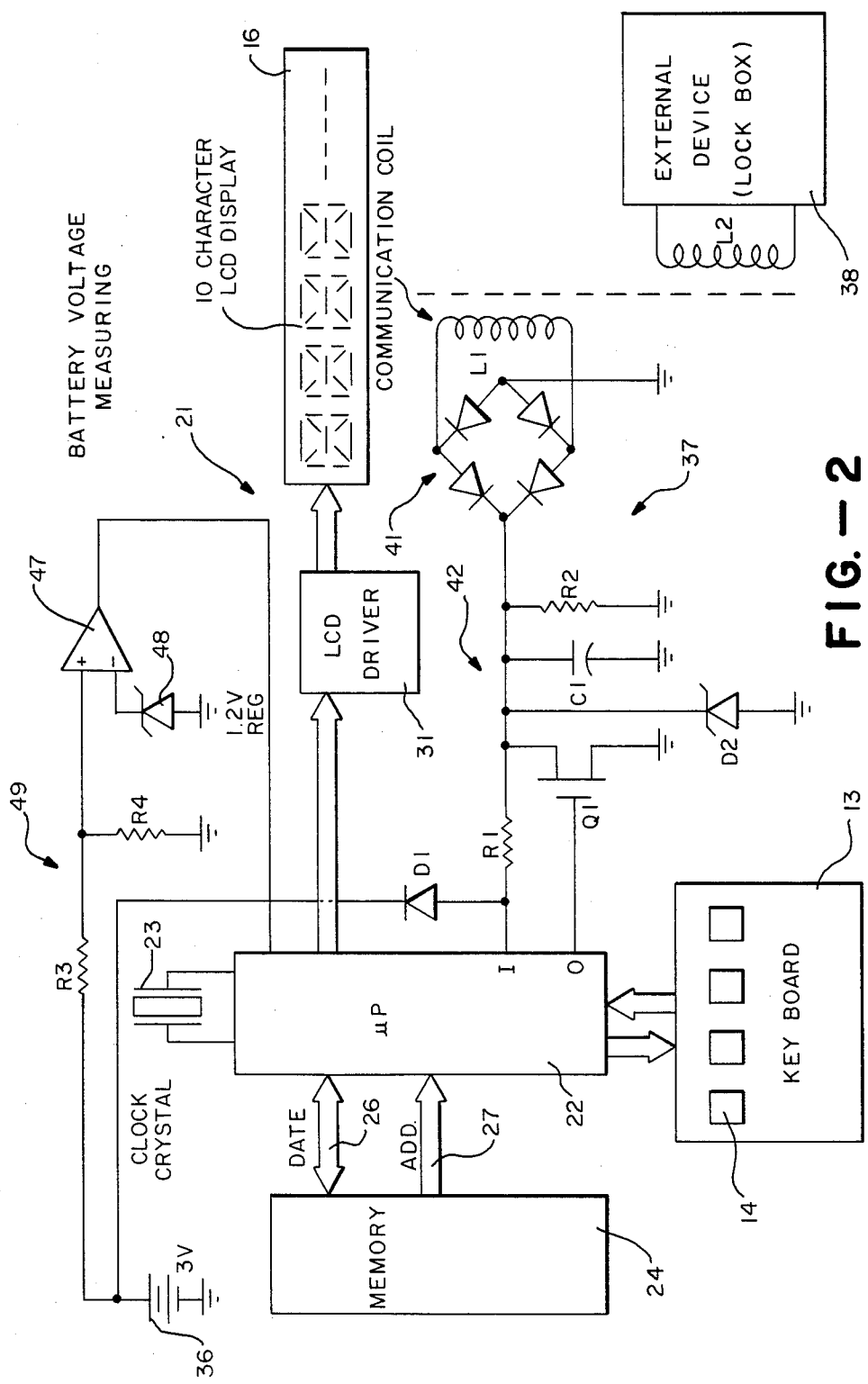
FIG. 2 is a circuit diagram of the circuitry utilized in the electronic access card shown in FIG. 1.

A 10-character alphanumeric liquid crystal display 16 is carried by the upper extremity of the printed circuit board 12 and is connected to circuitry 21 carried by the printed circuit board 12 and shown schematically in FIG. 2. As shown in FIG. 2, the circuitry 21 includes a microprocessor 22 of a conventional type which is controlled by a crystal clock 23. Several peripherals are connected to the microprocessor 22 and take the form of a memory 24 which is connected to the micrprocessor by data lines 26 and address lines 27. The memory 23 can be of any suitable size ranging from 1 k up to 64 k. A key pad or keyboard assembly 13 is connected to the microprocessor which is capable of ascertaining key depressions in the keyboard assembly 13. The microprocessor 22 is also connected to the LCD display 16 by a conventional LCD driver 31 which is connected to the microprocessor 22.

A battery 36 such as a lithium battery is mounted on the printed circuit board and supplies a suitable voltage such as three volts. The battery is connected to passive telecommunication circuitry 37 also carried by the printed circuit board. The circuitry 37 is used for communicating with an external device 38 such as a lock box of the type described in U.S. Pat. No. 4,609,780. The passive telecommunication circuitry 13 includes a coil L1 which is adapted to communicate with a coil L2 forming a part of the external device 38. The coil L1 is connected across a full wave diode bridge rectifier 41. The output of the rectifier 41 is supplied through a protective network 42 consisting of a resistor R1, a diode D1 and a zener diode D2 to an input I of the microprocessor 22. The protective network 42 serves to protect the microprocessor 22 from inductive spikes which might be picked up by the communication coil L1. The diode D2 has an appropriate breakdown voltage which is less than the breakdown voltage of the transistor Q1. A capacitor C1 in conjunction with a resistor R2 provides appropriate filtering. With the electronic access card 11 shown in FIG. 1 and which includes the circuitry shown in FIG. 2, power consumption from the battery is minimal during transmission and reception. The same coil L1 is utilized for both transmission and reception. During the reception, the voltage induced in the coil L1 within the electronic access card is rectified by the bridge rectifier 41 and supplied to the microprocessor input I through the protective network.

By way of example, the transmission typically received by the coil L1 is pulse width modulated, which information is supplied to the microprocessor 22. The microprocessor converts the information into digital 1's and 0's for storage in the memory 23. The output of the microprocessor is supplied on the terminal 0 to the gate of a N-channel MOSFET transistor Q1. The drain of the transistor Q1 is connected to the bridge rectifier 41.

With the electronic access card 11 shown in FIG. 1 and which includes the circuitry shown in FIG. 2, power consumption from the battery is minimal during transmission and reception. The same coil L1 is utilized for both transmission and reception. During the reception, the voltage induced in the coil L1 within the electronic access card is rectified by the bridge rectifier 41 and supplied to the microprocessor input I through the protective network.

The resistor R2 and the capacitor C1 provide a filter with a RC time constant which is less than 1/10th the shortest pulse width in the pulse wave transmission being received by the electronic access card. The voltage induced in the coil L1 is equal to or greater than 3 volts so that no amplification is required within the access card.

During transmission from the electronic access card, the microprocessor 22 reads the contents from the memory 23 and serially transmits a pulse width modulated stream of data through the output $0_1$. The transistor Q1 is turned on for the appropriate duration, depending on whether it is an 0 or a 1. When the transistor Q1 turns on, a low impedance load is placed across the coil L1 and when the transistor Q1 is turned off, the loading on the coil L1 is removed.

During transmission by the electronic access card, the external device 38 supplies and maintains an unmodulated radio frequency field surrounding the access card coil L1. The loading and unloading of the coil L1 by the turning on and off of the transistor Q1 modulates the loading effect of the coil L1 on the coil L2 of the external device 38 and thus essentially creates an amplitude modulated pulse width modulated signal cross the coil L2. The external device 38 demodulates this information so that it can be utilized for further processing if desired in the external device.

A type of telemetry which is utilized in the electronic access card is particularly useful since it requires the use of very little power, thus prolonging the useful life of the access card battery 36.

It can be seen that the microprocessor 22 does not expend any energy in transmission except for turning the transistor Q1 on and off which is quite small. Thus no energy is used from the internal battery to power the inductor L1. This helps to prolong the life of the battery 36 and thereby the life of the card before battery replacement is required. Radio frequency communication can be utilized for the communication link between L1 and L2. The coil L1 merely loads and unloads an externally present RF field generated by the coil L2.

The card has an additional advantage since it does not transmit radio frequency energy it will not disturb devices in close proximity to it, or accidentally erase magnetic strips on credit cards.

Means is provided for ascertaining when a low battery condition occurs and takes the form of a battery voltage measuring device 46 which is comprised of a comparator 47 that is provided with a suitable reference 48 such as one having 1.2 volts. A voltage divider network 49 having resistors R3 and R4 reduces the voltage from the battery so that it can be compared with the 1.2 volt reference.

Operation and use of the electronic access card 11 may now be briefly described as follows. The electronic access card 11 can be programmed so that it contains additional information other than the identification number described in co-pending application Ser. No. 899,533, filed Aug. 22, 1986. For example, the user's name (real estate broker), his phone number and his address can be programmed into the card using ASCII characters. Thus, when a real estate agent opens the key container of a lock box, in addition to his identification number being transferred into the lock box, listing information including his name, address and the like also would be transferred. This informaton is stored in the lock box. When the owner of the lock box arrives to poll the lock box to ascertain the number of visits and who visited the listed property, the information which is carried in the lock box can be read by the electronic access card 11 of the present invention when it is inserted into the lock box. The scroll keys provided on the electronic access card can be actuated to cause information which has been passed into the electronic access card 11 from the lock box to scroll across the liquid crystal display 16. In this way it is possible for a listing agent to rapidly ascertain the activity which has occurred to a listed property. If necessary, the real estate agent can rescroll the information by depressing the appropriate keys on the keyboard 13. If desired, the listing real estate agent can make notes with respect to information appearing on the liquid crystal display 16. Thus it can be seen with such an electronic access card 11, the need for a telephone transmission to a central computer is eliminated. Utilizing the electronic access card 11 gives an immediate alphanumeric display making it possible to access all the entries in the lock box.

It should be appreciated that if desired a small speaker could be mounted on the printed circuit board of the card 12 which could be utilized for transmitting information telephonically to a computer terminal. The card can use FM, FSK, AM, or DTMF transmission. Synthetic speech can be added to speak the content of the memory in addition to the display on the LCD display. Alternatively, a special computer or reader could be utilized to read the information carried by the card. In other words, a real estate broker could take his card and read out all of the boxes in which he is the listing agent and thereby store the information contained in the different lock boxes. After he has made his rounds and collected the information he could come back to his office and obtain a printout of the information contained in the lock boxes. It should be appreciated that a printout is not needed since the information is readily available on the display 16 merely by operating the scroll keys on the keyboard 13.

Another embodiment of the circuitry which can be provided on the electronic access card 11 is shown in FIG. 3 and as hereinafter described includes active telemetry or telecommunication circuitry which permits communication between a master card and a slave card. The circuitry 51 which is shown in FIG. 3 includes a microprocessor 52 of a conventional type controlled by a crystal clock 53 as well as a memory 54 connected by data and address lines 56 and 57.

A keyboard 58 is provided similar to the keyboard 13 but is different in that it is a full alphanumeric keyboard having all the alphabet characters from a to z, the numerals from 0 to 9 and various function keys.

The circuitry shown in FIG. 3 as the circuitry in FIG. 2 includes a display 61 of the same type as the display 16 in FIG. 2 which is connected through a driver 62 to the microprocessor 52. A speaker 63 is coupled to the microprocessor 52 through a speech synthesizer 64 providing an audio output from the information supplied by the microprocessor to the LCD display 61. The speech synthesizer 64 can be programmed to provide a male or female voice.

The active telemetry circuitry 65 of the circuitry shown in FIG. 3 consists of the coil L1 which functions in a manner similar to the coil L1 in FIG. 2. It is coupled through a filter network 66 consisting of a diode D1, a capacitor C1 and a resistor R1 to the input I of the microprocessor 52. The output O of the microprocessor 52 is coupled to the gate of a high frequency gatable oscillator 67 having a frequency range from approximately 10 khz to 1 megahertz. The output of the oscillator 67 is connected to a transistor Q1 which can be a P N P transistor or a P channel MOSFET transistor. The transistor Q1 is connected to the coil L1 and supplies energy to the coil L1 to cause it to radiate radio frequency energy which can be picked up by the pick-up coil of an external device of the type described in conjunction with FIG. 2. The output from the micrprocessor 52 typically is in the form of pulse width modulation.

Operation and use of the circuitry shown in FIG. 3 in conjunction with electronic access card with visible display is very similar to that hereinbefore described in conjunction with FIG. 2. The principal difference is that active telemetry is utilized in the circuitry shown in FIG. 3 whereas passive telemetry is utilized in the circuitry shown in FIG. 2. As hereinbefore explained, the electronic access cards are particularly adapted for use with external devices such as lock boxes. The electronic access cards with active telemetry can be utilized in place of a central station and can be programmed for receiving a program for generating cyclic codes that are needed for electronic access cards and for reading and displaying the information contained in the lock boxes. In such an application, the master card would have a complete alphanumeric keyboard 58 of the type hereinbefore described. Slave cards for utilization with such a master card would only need a limited keyboard such as the type shown in FIG. 2. The master card with the complete alphanumeric keyboard makes it possible to enter user names and other information when programming the slave cards. The master card is capable of generating cyclic codes to validate the slave cards. If desired, it should be appreciated that the slave cards can also be of the type described in co-pending application Ser. No. 899,533, filed Aug. 22, 1986.

With the use of the active telemetry shown in FIG. 3, it can be seen that battery power is utilized during transmission of information to create electromagnetic or radio frequency radiation to convey the information to an external device. As pointed out previously, battery power is not required for this function with the circuitry shown in FIG. 2.

From the foregoing it can be seen that in connection with the present invention it has been possible to provide an electronic access card which has a visual display to provide an immediate readout when desired, as for example, from a lock box to ascertain the activity with respect to that lock box. Card to card communication is possible. Trans-telephonic communication is possible utilizing the audio output, thereby making it possible to transmit information from a card to a central computer. The card 11 is capable of performing several central computer functions, such as generating cyclic codes, programming slave access cards and interrogating slave access cards and lock boxes.

The electronic access cards of the present invention are very small and generally have the size of a credit card and thus can be carried in a billfold. They can have a thickness ranging from 0.035 to 0.04 inches. Within such parameters an ultrathin speaker/microphone can be provided for interfacing with telephonic communication devices. High speed communication is possible with the electronic access cards making it possible to transmit substantial amounts of information, as for example, the user's true identity, by supplying the full name and the telephone number of the user upon each opening of the lock box. High speed two-way communication is provided between the electronic access cards and external devices such as lock boxes. The alphanumeric display provided by the liquid crystal display provides an immediate readout from lock boxes to give the activity with respect to that lock box. The electronic access cards, even though having these capabilities, can have a life ranging from 3 to 5 years. A low battery indication is provided on the liquid crystal display. Large internal memory can be provided. The circuitry provided permits the use of low cost CMOS microprocessors.

I claim:

1. In an electronic access card for use with a lock device, a printed circuit board, a microprocessor carried by the printed circuit board, keyboard means connected to the microprocessor for inserting information into the micrprocessor, coupling means coupled to the microprocessor and adapted to receive information from the lock device to be conveyed to the microprocessor and adapted to transmit information from the microprocessor to the lock device and visual display means coupled to the microprocessor for visually displaying information which is carried in the microprocessor and supplied to or from the lock device.

2. A card as in claim 1 wherein the keyboard means is a full alphanumeric keyboard and scroll keys for scrolling information received from the lock device.

3. A card as in claim 1 wherein the means coupled to the microprocessor includes electronic circuitry.

4. A card as in claim 3 wherein said electronic circuitry is passive electronic circuitry.

5. A card as in claim 3 wherein said electronic circuitry as active electronic circuitry.

6. A card as in claim 5 wherein said active electronic circuitry includes transistor means and a high frequency gatable oscillator connected to the transistor.

7. A card as in claim 4 wherein said passive electronic circuitry includes a bridge and transistor means coupled between the microprocessor and the bridge.

8. A card as in claim 3 wherein said electronic circuitry includes filter means.

9. A card as in claim 1 together with a battery carried by the card and connected to the microprocessor.

10. A card as in claim 9 together with low battery comparison means coupled to the battery and to the microprocessor to provide a low battery indication on the display in the event a low battery condition occurs.

11. A card as in claim 1 wherein said display is a liquid crystal display.

12. A card as in claim 1 together with a clock coupled to the microprocessor.

13. A card as in claim 1 together with acoustical communication means coupled to the microprocessor.

14. A card as in claim 13 wherein said acoustical communication means includes a synthetic speech synthesizer.

15. In an electronic access card for use with a lock device, a printed circuit board, a microprocessor carried by the printed circuit board, keyboard means carried by the printed circuit board and connected to the microprocessor for inserting information into the microprocessor, coupling means carried by the printed circuit board and coupled to the microprocesor and adapted to receive information from the lock device and adapted to transmit information to the lock device.

16. A card as in claim 15 wherein said keyboard means is a complete alphanumeric keyboard.

17. A card as in claim 15 wherein said active electronic circuitry includes transistor means connected to the coil and a high frequency gatable oscillator coupled to the microprocessor and coupled to the transistor.

18. A card as in claim 15 together with filter means connected between the coil means and the input to the microprocessor.

19. A card as in claim 15 together with a battery carried by the card and connected to the microprocessor and to the active electronic circuitry.

20. A card as in claim 19 together with low voltage battery ascertaining circuitry connected to the battery and coupled to the microprocessor for giving an indication when a low battery condition occurs.

21. A card as in claim 15 together with a visual display coupled to the microprocessor.

22. A card as in claim 15 together with audible communication means coupled to the microprocessor and carried by the card.

* * * * *